United States Patent [19]

Dubner et al.

[11] 4,019,629
[45] Apr. 26, 1977

[54] PRESSURIZED TENNIS BALL CONTAINER

[76] Inventors: Robert B. Dubner, 40 Dogwood Ave.; Harold Bienenfeld, 145 Dogwood Ave., both of Roslyn Harbor, N.Y. 11576

[22] Filed: Feb. 13, 1975

[21] Appl. No.: 549,473

[52] U.S. Cl. ............... 206/315 B; 73/419; 137/859; 215/335; 273/61 D; 417/555 R
[51] Int. Cl.² ............... B65D 85/16
[58] Field of Search ............... 206/315, 315 B; 273/61 D, 61; 222/401; 137/525, 859; 73/419; 92/159; 417/555 R, 555, 545, 549; 215/335

[56] References Cited

UNITED STATES PATENTS

| 119,641 | 10/1871 | Powell | 222/401 |
|---|---|---|---|
| 225,293 | 3/1880 | Martin | 222/401 |
| 842,689 | 1/1907 | Norman | 417/555 |
| 984,153 | 2/1911 | Olsen | 73/419 |
| 996,358 | 6/1911 | Olsen | 73/419 |
| 1,294,023 | 2/1919 | Arbuckle | 92/159 |
| 1,777,009 | 9/1930 | Matson | 73/419 |
| 1,911,125 | 5/1933 | Miller | 273/61 D |
| 2,589,716 | 3/1952 | Marsh | 137/525 |
| 2,689,533 | 9/1954 | Ericson | 417/555 |
| 2,745,660 | 5/1956 | Delahay | 277/165 |
| 2,789,578 | 4/1957 | Goepfrich | 137/525 |
| 2,985,359 | 5/1961 | Hanje | 222/401 |
| 3,233,727 | 2/1966 | Wilson | 206/315 B |
| 3,486,654 | 12/1969 | Schellhas | 215/335 |
| 3,572,532 | 3/1971 | Shannon | 215/218 |
| 3,581,881 | 6/1971 | Hobbs | 206/315 |
| 3,807,430 | 4/1974 | Keller | 137/525 |
| 3,853,222 | 12/1974 | Helms | 206/315 |
| 3,888,347 | 6/1975 | Kramer | 220/303 |

Primary Examiner—William Price
Assistant Examiner—Allan N. Shoap
Attorney, Agent, or Firm—Edward F. Levy

[57] ABSTRACT

A pressurized tennis ball container has a cover which fits onto a standard metal tennis ball can. The cover includes a hand pump having a sliding seal which opens to permit rapid refilling of the hand pump cylinder with air during the upstroke of the piston, an air pressure indicator, which indicates the pressure within the can, a pressure release member to release the air pressure within the can to facilitate opening the cover, and an improved diaphragm valve.

9 Claims, 4 Drawing Figures

PRESSURIZED TENNIS BALL CONTAINER

The present invention relates in general to tennis ball containers and in particular to a tennis ball container in which tennis balls are stored under pressure.

Tennis balls are conventionally packaged in a hermetically-sealed metal can containing three balls, and are sold in this manner. The can contains gas under pressure which surrounds the balls. The reason for such presurization is that each tennis ball is hollow and its interior is filled with gas under pressure which gives the ball its proper resiliency and uniform bounce. Tennis balls however, have a porous skin and over a period of time the contained gas under pressure would escape if it were not for the gas under pressure in the can which prevents this. The hermetically-sealed metal can must be opened to use the balls and once its seal is broken, the gas under pressure escapes. When the balls are used and replaced in the can for storage, the interior of the can is no longer pressurized.

The tennis ball container of the present invention comprises a can in which tennis balls may be stored between games, the can having a removable cover which may be attached and detached for removal and replacement of the tennis balls.

The container cover has an integral pump which provides the necessary pressure in the container to prevent the gas in the tennis balls for escaping through the porous skin, no matter how long the balls are stored. Provision of such an integral pump is conventional and well-known, and several types of pump of this type are disclosed in the prior art. The novelty of the container of the present invention resides in a unique sliding seal on the piston of the pump which permits rapid refilling of the pump, thus improving the pumping action, as well as a novel valve on the pump cylinder having improved sealingl action, a transparent pressure indicator to indicate the pressure within the container, and a pressure release member to facilitate easy removal of the cover of the container.

The above features overcome the deficiencies of the tennis ball containers according to the prior art in which the pump for pressurizing the containers is relatively difficult to operate; the cover for the container is relatively difficult to remove once the container has been pressurized; and no means are provided to estimate when the proper pressure in the container has been attained as the pump is operated.

It is an object of the present invention to provide a pressurized tennis ball container having a sliding seal which opens to permit rapid refilling of the pump cylinder.

Another object of the present invention is to provide a pressurized tennis ball container having a pressure relief member to release the pressure built up in the container, and thereby facilitate easy opening of the container.

Another object of the present invention is to provide a pressurized tennis ball container having a pressure indicator to indicate the pressure within the container.

Another object of the present invention is to provide a pressurized tennis ball container having a novel valve having improved sealing performance.

Another object of the present invention is to provide a container of the character described having a cover which includes an integral hand pump, and which can easily be mounted on any regular metal tennis ball can forming a pressurized tennis ball container.

Still another object of the present invention is to provide for a pressurized tennis ball container, a cover having an integrally molded transparent pressure indicator and an integrally molded pump cylinder, which cover consists of relatively few parts and is economical to manufacture at a relatively low unit cost.

In accordance with the present invention there is provided a cover assembly adapted to be mounted on a standard metal can in which tennis balls are packaged. The cover assembly includes an integral hand pump or pressurizing the can, and integral pressure indicator and a pressure release member. The can adapter is in the form of a split ring which can easily be forced over the rim on the tennis ball can and has an externally threaded portion which fits the cover. The split ring feature makes mounting the can adapter onto any metal tennis ball can extremely simple and the threaded portion likewise makes the attachment of the cover simple and rapid.

The hand pump includes a cylinder in which a hand operated piston slides to pressurize the can. The piston includes a novel sliding sealing member which provides a seal between the piston and the cylinder during the downstroke of the piston, thus forcing air under pressure into the can, the sealing member automatically opening during the upstroke of the piston to permit air to refill the cylinder so as to be compressed by the next downstroke of the piston.

The cover assembly also includes a novel valve, in contrast to the conventional flap valve which is found in the pumps of pressurized tennis ball containers of the prior art. The valve of the present invention comprises a circular diaphragm having its peripheral edge restrained and a central portion which has a small hole located out of alignment with an air passage in a convex surface located on the bottom of the pump cylinder. Air under pressure from the piston in the cylinder flows through the air passage and flexes the central portion of the diaphragm away from the convex surface. The air then flows between the convex surface and the diaphragm and through the hole in the diaphrapm into the tennis ball can thus pressurizing the can. Air under pressure in the can, acting in the reverse direction, tends to force the diaphragm against the convex surface, and since the hole in the diaphragm and the air passage are not in alignment, outward flow is prevented.

The cover assembly also includes a transparent pressure indicator which is integrally molded on the cover, the pressure indicator including a transparent cylinder having a closed upper end and a lower end open to the tennis ball can. An indicator piston rises within the cylinder responsive to increased pressure within the can thus indicating the pressure developed by the pump.

The cover assembly also includes a pressure release member which is used to release the pressure in the can prior to opening the cover. Releasing the pressure in the can relieves the loading on the cover due to such internal pressure, thus enabling the cover to be easily opened to removal of the contained tennis balls, without wear or undue strain on the component parts.

Additional objects and advantages of the invention will become apparent during the course of the following specification, when taken in connection with the accompanying drawings, in which:

FIG. 4 is a top plan view of the pressurized tennis ball container of FIG. 1.

Figure 1:
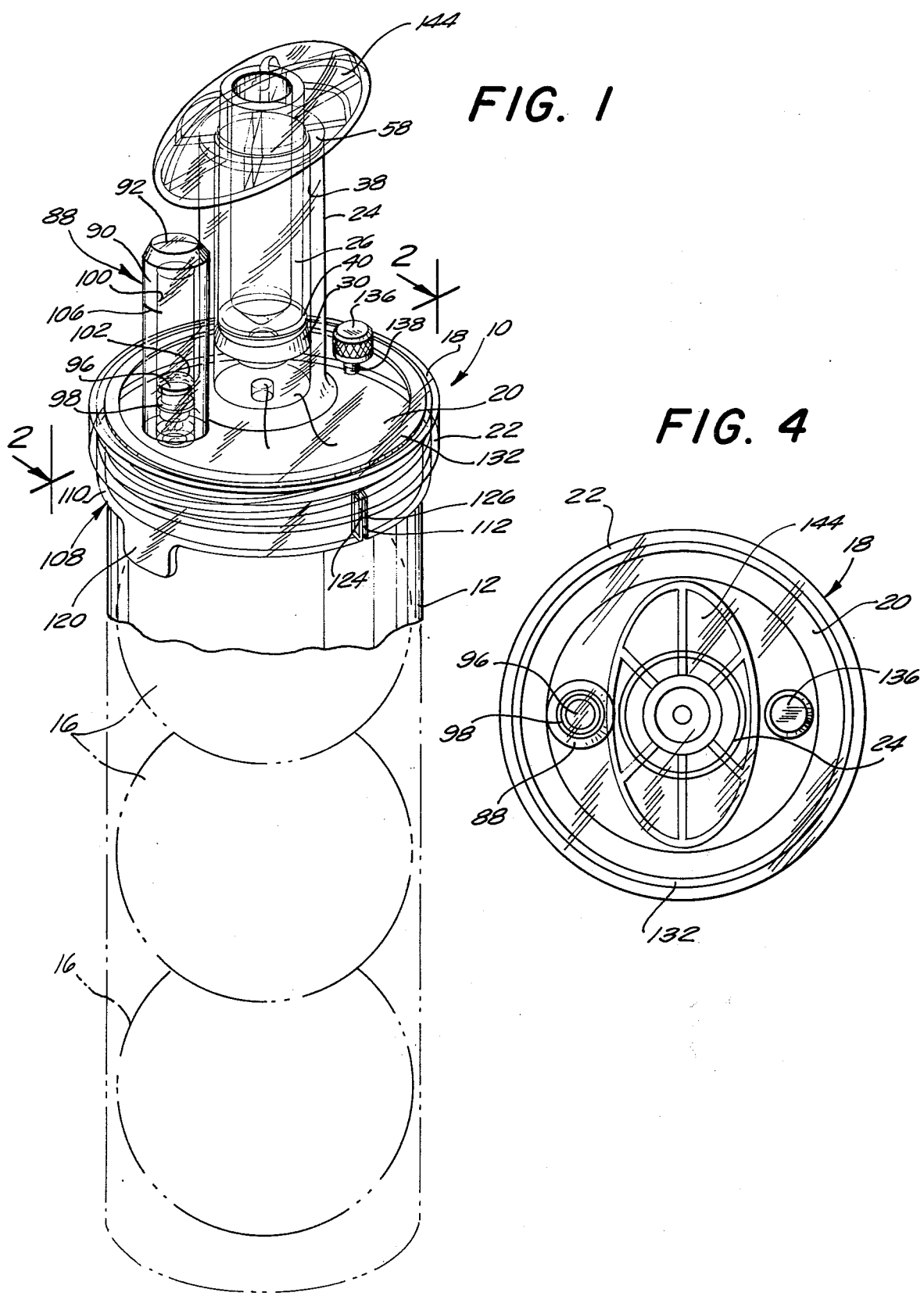
FIG. 1 is an overall perspective view of an assembled pressurized tennis ball container made in accordance with the present invention, with the cover shown mounted on a standard metal tennis ball can which is broken away and shown in phantom to show three tennis balls contained therein.

Referring in detail to the drawing, there is shown in FIG. 1 a preferred embodiment of a pressurized tennis ball container made in accordance with the present invention. The tennis ball container generally comprises a novel cover assembly 10 which is attached to a standard metal tennis ball can 12.

Figure 2:
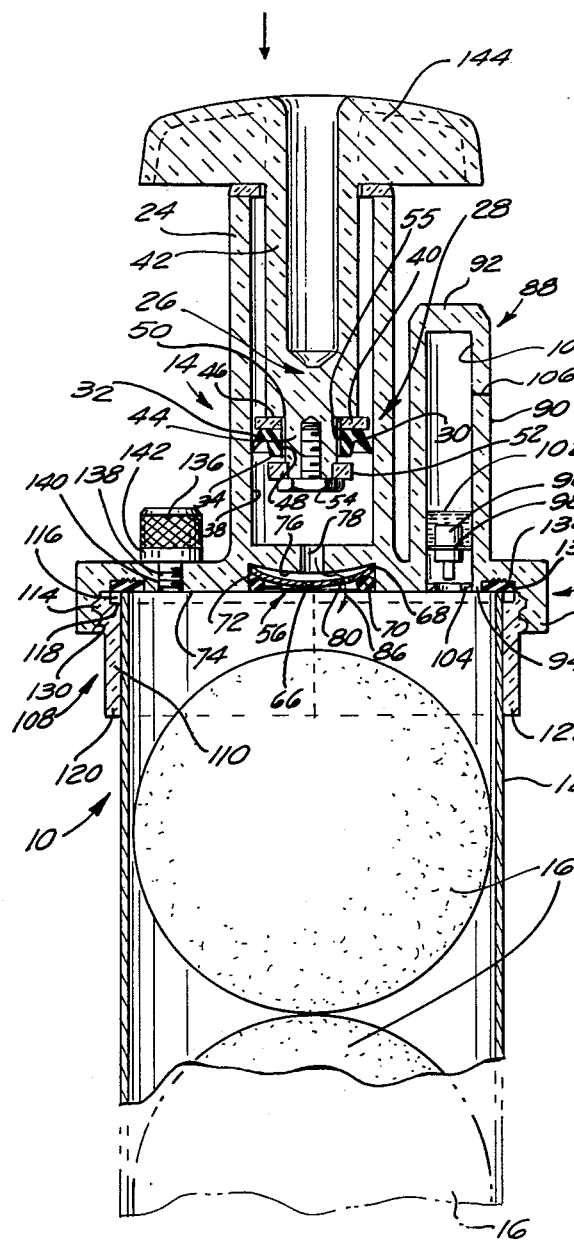
FIG. 2 is a longitudinal section taken alone line 2 — 2 of FIG. 1, and showing the positions of the parts during a downstroke of the piston.
Figure 3:
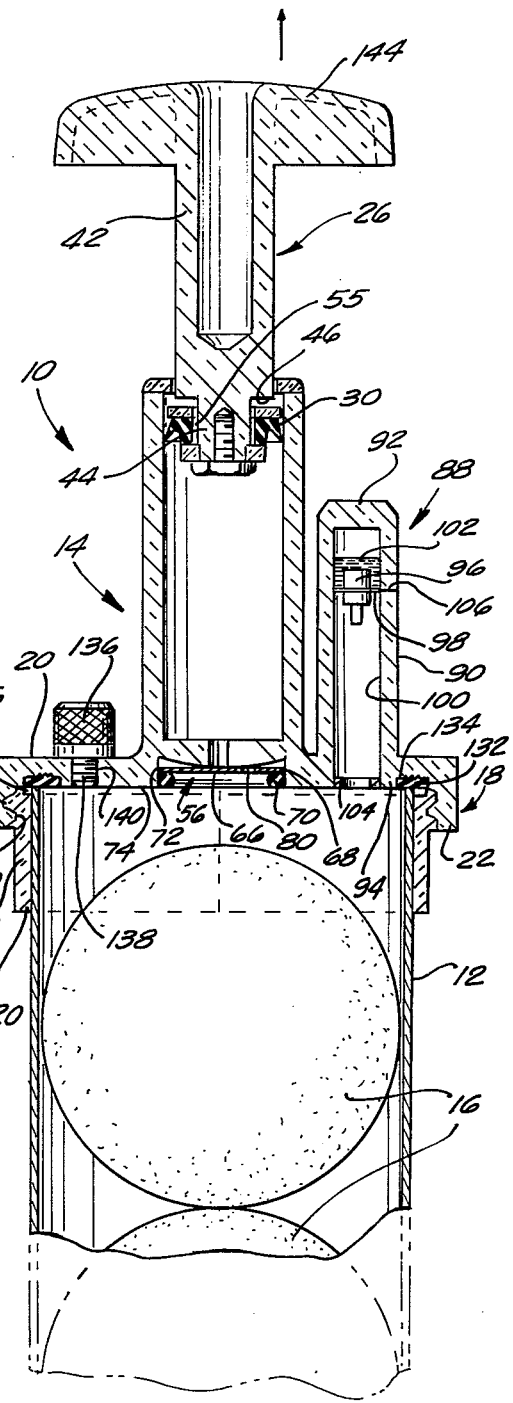
FIG. 3 is a longitudinal section similar to FIG. 2, but showing the positions of the parts at the completion of an upstroke of the piston.

The cover assembly 10 includes a pump body 14 which fits over and seals the open top end of the can 12 which is of cylindrical shape and conventional size for containing three tennis balls 16. The pump body 14 has a circular cover portion 18 comprising a flat top wall 20 bordered by an integral depending peripheral flange 22 which functions, in a manner to be presently described, to attach the cover portion tightly to the top of the can 12, as shown in FIGS. 1, 2 and 3.

A pump cylinder 24 is formed integrally with the top wall 20 of cover portion 18, and extends upwardly from the center thereof. Slidably mounted within the cylinder 24 is a piston 26 carrying a sliding seal 28 which closes to seal the cylinder 24 during the downstroke of the piston 26, and which opens to refill the cylinder with air during the upstroke of said piston.

The sliding seal 28 includes a sealing ring 30 having a conical outer circumferential surface 32, a flat bottom surface 34 and a flat top surface. The conical outer surface has a bottom edge of sufficiently large diameter to make wiping contact along the inner wall surface 38 of the cylinder 24. The sealing ring 30 is made of rubber or similar elastomeric material, and is mounted adjacent to a grommet 40 of rigid plastic material, the grommet having a top wall which overlies the flat top surface 34 of sealing ring 30.

The piston 26 is made of a rigid, transparent plastic material and comprises a cylindrical body portion 42 having an outer diamter less than the inner diameter of the cylinder 24 so that air can pass around the piston body into the interior of said cylinder. At its lower end, the piston body portion 42 terminates in a cylindrical extension 44 of appreciably smaller diameter, and forms a shoulder 46 therewith. The sealing ring 30 has a central hole 48 of appreciably larger diameter than the external diameter of the piston extension 44, and the grommet 40 has a central hole 50 which is also of larger diameter than the piston extension 44, and which registers with the hole 48.

The thickness of the sealing ring 30 is also appreciably less than the length of the piston extension 44, so that during the pumping action, the sealing ring 30 moves along the piston extension between the shoulder 46 and a retaining washer 52 which is attached to the bottom of the piston extension 44 by a screw 54. At the start of the piston downstroke, the shoulder 46 engages the grommet 40 at the top of sealing ring 30 so that no air can pass through the annular space 55 between the outer surface of the piston extension 44 and the inner surface of the sealing ring 30. The piston 26 then drives the sealing ring 30 downwardly through the cylinder 24 so that air in the cylinder is forced under pressure through a valve 56 and into the interior of the can 12, as shown in FIG. 2.

On the upstroke of the piston 26, the shoulder 46 moves upwardly, away from the grommet 50 and the top surface of the sealing ring 30, as shown in FIG. 3, thus opening the annular space 55 and allowing air to pass through and refill the cyulinder 24 so as to be driven into the can 12 during the next downward stroke of the piston 26. In such refilling of the cylinder 24, the air flows past a piston retaining ring 58 which is mounted on the top surface of cylinder 24 and which has a loose fit around the piston 26. The retaining ring 58 has an inner diameter less than the inner diameter of the cylinder 24, and engages the grommet 40 at the end of the piston upstroke, as shown in FIG. 3, to prevent the piston from being withdrawn from the cylinder 24. On the upstroke of the piston 26, the bottom surface 34 of the sealing ring 30 is engaged by the retaining washer 52, and is lifted thereby through the cylinder 24, as the sealing ring 30 moves slidably along the inner surface of said cylinder. The refilling of the cylinder 24 with air, resulting from the opening of the annular space 55, permits the piston 26 to be raised quickly and easily to the top position thus making the pumping action relatively easy and rapid.

The retaining washer 52 may be provided with one or more radial slots (not shown) which facilitate the flow of air entering the cylinder during the upstroke of the piston 26. Such slots permit the flow of air through the retaining washer 52 and prevent the bottom surface 34 of the sealing ring 30 from forming an air-tight seal against the retaining washers 52.

The valve 56 includes a circular diaphragm 66 which is made of a relatively soft flexible material such as a soft vinyl. The diaphragm 66 is retained around its circumferential edge 68 by a retaining ring 70, within a circular recess 72 formed in the bottom surface 74 of the cover 18. The recess 72 is located directly below the cylinder 24. The recess 72 has a convex upper surface 76 in the center of which is located an air passage aperture 78 which communicates with the cylinder 24. The diaphragm 66 includes a hole 80 which is off-center and out of alignment with the air passage aperture 78. On the downstroke of the piston 26, air which is driven through the air passage aperture 78, flexes the central portion of the diaphragm 66 away from the convex surface 76, in the manner shown in FIG. 2. The air, compressed by the sealing ring 30, thus flows into the space 84 formed between the convex surface 74 and the diaphragm 66 and enters the can 12 through the hole 80 in the diaphragm 66. The path of the air flow is shown by the arrow 86 in FIG. 2. On the completion of the downstroke of the piston 26, air pressure within the can 12 forces the diaphragm 66 against the convex surface 76 and thus seals the can 12. The hole 80 in the diaphragm 66 being out of alignment with the air passage aperture 78, does not permit the flow of air from the can 12 into the cylinder 24.

The cover portion 18 also includes a pressure indicator 88 which comprises a upwardly extending transparent hollow cylinder 90 having a closed upper end 92 and a lower end 94 open to the inside of the can 12. An indicator piston 96 is disposed within the hollow cylinder 90 and has an O-ring 98 which makes wiping contact with the inner wall 100 of the hollow cylinder 90. A small quantity of oil 102 placed above the indicator piston 96 lubricates the inner wall 100 of the hollow cylinder 90 for free sliding of the indicator piston 96, and completes the seal between the O-ring 98 and the inner wall 100. The oil 102 also adds to the visibility of the indicator piston 96.

The indicator piston 96 is retained within the hollow cylinder 90 by a retainer ring 104 affixed to the lower end 94 of cylinder 90. When the pressure in the can 12 is raised sufficiently, by the pumping action of the piston 26, the pressure on the lower surface of the indicator piston 96 forces the piston upwardly, and the latter rises within the hollow cylinder 90 as shown in FIG. 3.

The cylinder 90 is preferably provided with a visible reference line 106 which indicates that the desired pressure in the can 12 has been reached, when the O-ring 98 moves into registry with the line 106. A pressure of between ten to twenty pounds per square inch is the normal pressure for storing tennis balls. The cover portion 18 and the hollow cylinder 90 are an integral unit molded in a clear and transparent rigid plastic. One sutiable plastic is polycarbonate.

A can adapter 108 is provided for mounting the cover 18 on any standard metal tennis ball can 12. The can adapter 108 comprises a ring 110 which is split at 112 (FIG. 1) and an externally threaded portion 114. The split 112 provides a measure of flexibility to the ring 110 making it easy to force the ring 110 over the rim or bead 116 at the top of the standard metal tennis ball can 12. A recessed portion 118 of the top of the ring 110 abuts the rim 116 of the tennis ball can 12 when the can adapter 108 is in operative position at the top of said can. A pair of integrally formed tabs 120, 122 project downward from the ring 110 and facilitate holding the ring 110 when the cover 18 is installed. The split 112 in the ring 110 is preferrably disposed on the ring 110 at a location in which the split 112 cuts a single flight of the thread 114. This aids in the alignment of the free ends 124, 126 of the ring 110 bordering the split 112, as the cover 18 is screwed on to the can adapter 108.

The depending peripheral flange 22 of cover 18 is formed with internal threads 130 matching the external threading 114 of the can adapter 108. Mounted on the bottom surface 74 of cover 18 is a resilient gasket 132 which abuts the top of the rim 116 of the can 12 and seals the can 12 against loss of pressure after the cover 18 is installed. The resilient gasket 132 fits within a recess 134 in the bottom surface 74 of the cover 18.

A pressure release member 136 if provided to facilitate easy removal of the cover 18 from the can 12. The pressure release member 136 has a threaded shank 138 which screws into a threaded hole 140 in the cover 18. The pressure release member 136 also includes a gasket 142 which bears against the top surface of cover 18 when the pressure release member 136 is screwed tightly onto said cover 18. When the pressure release member 136 is unscrewed, the gasket 142 no longer bears tightly against the surface of cover 18 and the pressure within the can 12 is released. This reduces the axial loading on the threads 114, 130 and the gasket 132, and the cover 18 is easily unscrewed from the can adapter 108.

In use, after a standard tennis ball can is opened and the contained tennis balls removed for playing, when it is desired to replace the tennis balls for storage, the standard metal can cover is discarded and replaced by the cover assembly 10. The split ring 110 is inserted about the can and the cover portion 18 attached tightly thereto by means of the matched threading 114, 130. The pump 14 is then manually operated by grasping the handle at the top of the piston body 42, and the pump strokes are continued until the pressure indicator 88 shows that the desired pressure within the can 12 has been achieved. The tennis balls may then be stored indefinitely in this pressurized condition. When it is desired to again remove the tennis balls for use, the pressure release member is loosened, allowing the compressed air within the can to escape, and the cover 18 is easily removed from the can 12.

While preferred embodiments of the invention have been shown and described herein, it is obvious that numerous additions, changes and omissions may be made in such embodiments without departing from the spirit and scope of the invention.

What is claimed is:

1. A cover assembly for use with a metal tennis ball can to form a pressurized tennis ball container, comprising a transparent cover member sized to overlie the top of said can and having a integral pump cylinder upstanding therefrom, a pump piston extending into said pump cylinder, piston seal means mounted on said piston including a sealing ring slidably mounted on said piston and providing a wiping seal between said piston and said pump cylinder for preventing the flow of air past said piston on the downstroke of said piston and with said means opening to permit airflow past said piston on the upstroke of said piston to refill said cylinder, valve means disposed to permit the flow of air from said cylinder into said tennis ball can and to prevent the flow of air in the reverse direction, means for mounting said cover member on said tennis ball can, pressure release mounted on said cover member for venting pressure from said tennis ball cans, and pressure indicator means on said cover for indicating the attainment of a selected pressure within the can upon which said cover member is mounted by operation of said pump piston, said pressure indicating means including a transparent cylinder formed integrally with said transparent cover member and upstanding therefrom, said transparent cylinder having a closed top end and an open bottom end communicating with the interior of said can, a piston slidably mounted in said cylinder and visible therethrough, and a reference line on said cylinder at a location to indicate the attainment of said selected pressure within said can when said piston registers with said reference line, said pressure indicator means providing a continuous visual indication of the pressure within said can until said pressure is released by said pressure release means.

2. A cover assembly according to claim 1 in which said pressure release means comprises a threaded aperture extending through said cover member and communicating with the interior of said can, a manually-operable release member having an enlarged head overlying the outer surface of said cover member and having a threaded shank engaging said threaded aperture, and a gasket underlying said enlarged head and engaging the upper surface of said cover member when said release member is tightened against said gasket, said release member being adapted to be manually untightenend to vent pressure from said can through said threaded aperture, thereby permitting said cover member to be removed from said can.

3. A cover assembly according to claim 1 in which said cover member includes an integral peripheral flange having an internally threaded portion, and in whcih said means for mounting said cover member includes can adapter means comprising a split ring having an externally- threaded portion fitting said internally threaded portion of said peripheral flange, said split ring being sized for slidable mounting on the outer surface of said can, and being extensible in diameter to permit removal from and replacement on said can, said cover member also mounting a resilient gasket positioned to engage the top edge of said can.

4. A cover assembly according to claim 1 in which said valve means comprises a flexible diaphragm having a hole offset from the center thereof, a recess in the bottom surface of said cover member beneath said pump cylinder, an air passage aperture in said cover member located centrally in said recess and in communication with the bottom of said pump cylinder, a retaining ring disposed to hold the periphery of said diaphragm in contact with the inner surface of said recess, said air passage aperture being aligned with the center of said diaphragm and spaced from the offset hole in said diaphragm, whereby increased air pressure in said cylinder causes air to flow through said air passage aperture and to impinge on the center of said diaphragm to flex said diaphragm away from the inner surface of said recess, with the misalignment of said hole and said air passage preventing the flow of air in the reverse direction.

5. A cover assembly according to claim 4 which said inner surface of said recess has a convex contour.

6. A cover assembly according to claim 1 in which the piston of said pressure indicator means comprises a rigid piston body and an O ring secured to said body and having a peripheral portion forming a sliding seal with the inner surface of said transparent hollow cylinder and disposed to rise within said transparent hollow cylinder responsive to increased air pressure within said cylinder.

7. A cover assembly according to claim 6 further including a small quantity of oil disposed on top of said indicator piston for lubrication of said sliding seal and increased visibility of said indicator piston through the transparent cylinder.

8. A cover assembly according to claim 6 in which said cover member and said transparent hollow cylinder are an integral unit molded of a clear plastic.

9. A cover assembly according to claim 1 in which said piston seal means comprises an integral depending extension on the lower end of said piston having a diameter smaller than the diameter of said piston and forming a shoulder therewith, said sealing ring being slidably mounted on said piston extension, said sealing ring having a central mounting hole of appreciably larger diameter than said piston extension which passes through said mounting hole, and having a thickness less than the length of said piston extension, with said sealing ring making sealing contact with said shoulder on the downstroke of said piston and being carried downwardly by said piston through said cylinder for pressurizing air within said cylinder, said sealing ring sliding away from said shoulder on the upstroke of said piston, thereby permitting air to flow between said sealing ring and said piston extension to refill said cylinder.

* * * * *